Sept. 4, 1962 J. C. SZEMPLAK ETAL 3,051,965
SUPINE BED
Filed Feb. 27, 1961 5 Sheets-Sheet 3

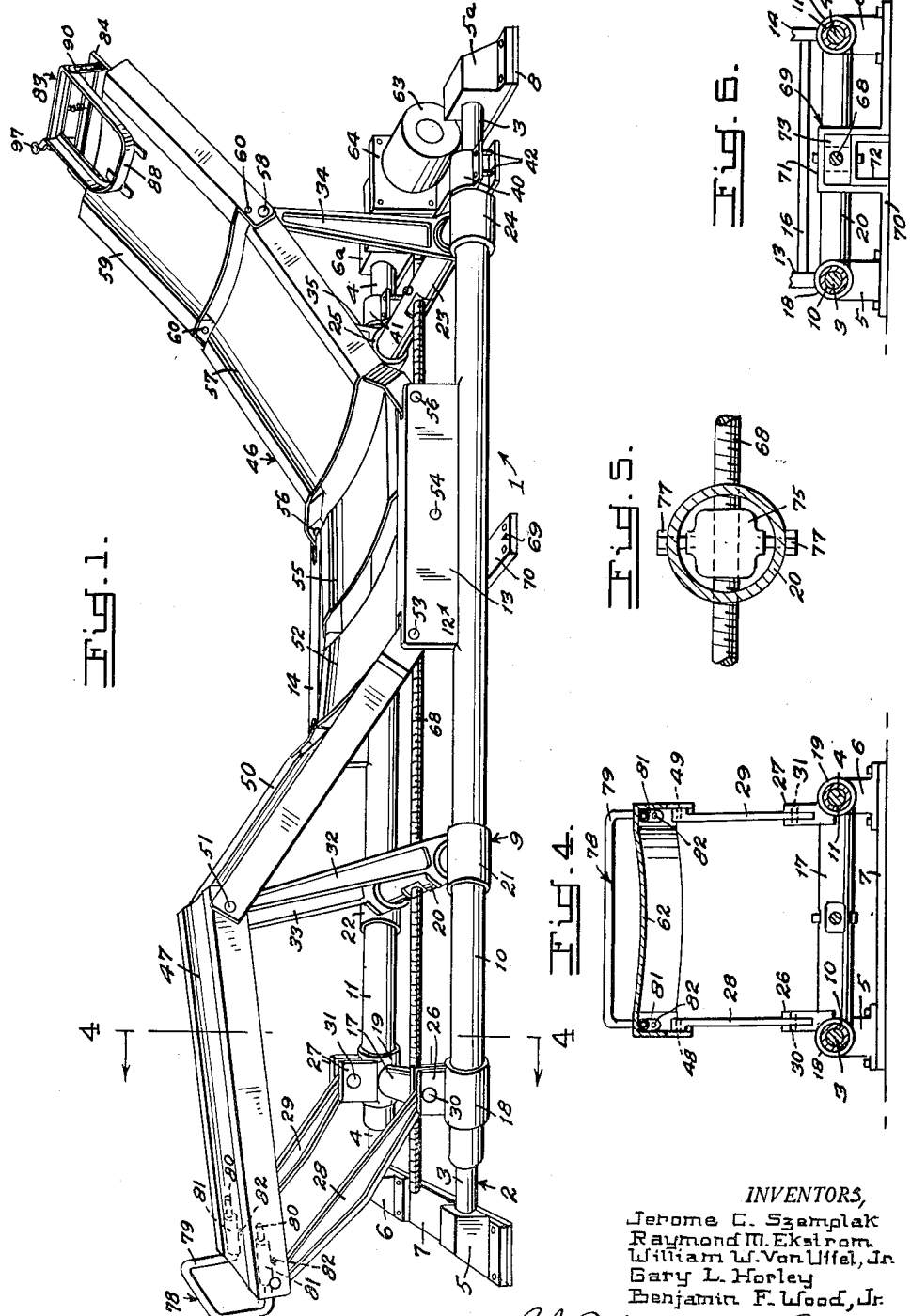

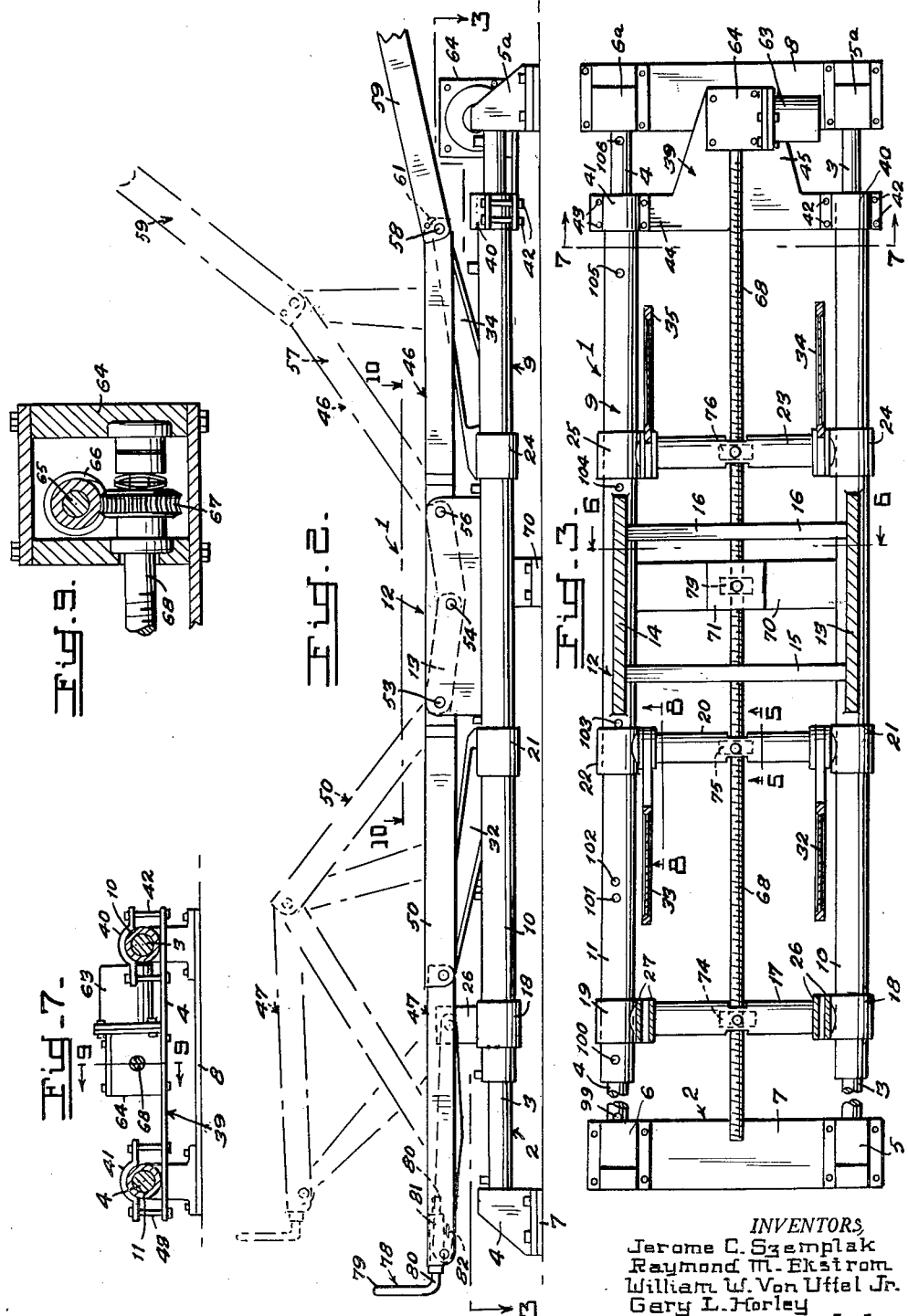

INVENTORS,
Jerome C. Szemplak
Raymond M. Ekstrom
William W. Von Uffel, Jr.
Gary L. Horley
Benjamin F. Wood, Jr.

By: S. J. Rotondi & A. J. Dupont

Sept. 4, 1962 J. C. SZEMPLAK ETAL 3,051,965
SUPINE BED
Filed Feb. 27, 1961 5 Sheets-Sheet 4
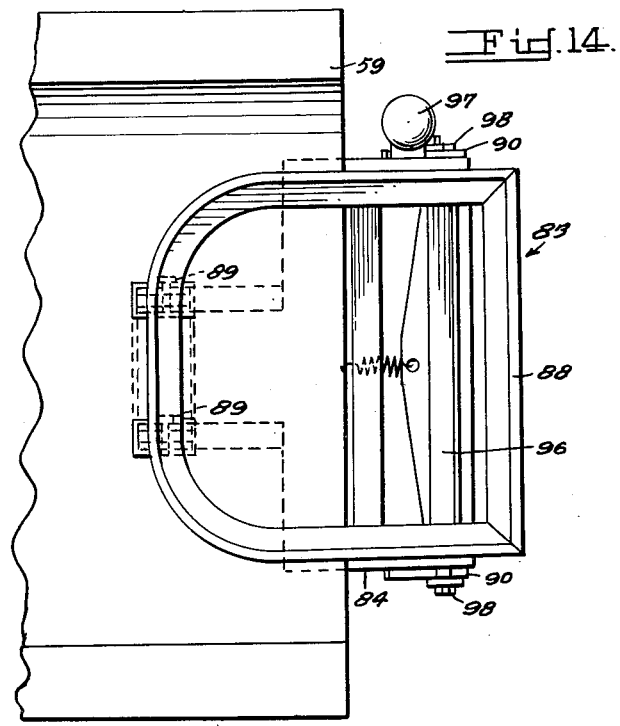
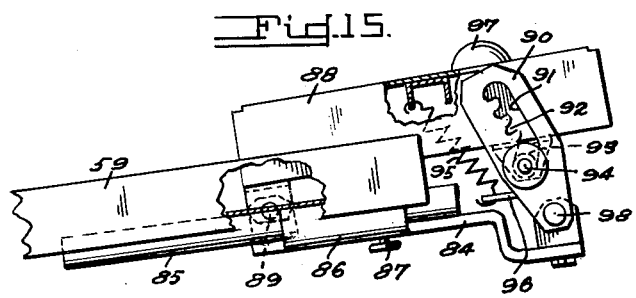
INVENTORS,
Jerome C. Szemplak
Raymond M. Ekstrom
William W. Von Uffel, Jr.
Gary L. Horley
Benjamin F. Wood, Jr.
BY: S. J. Rotondi & O. J. Dupont

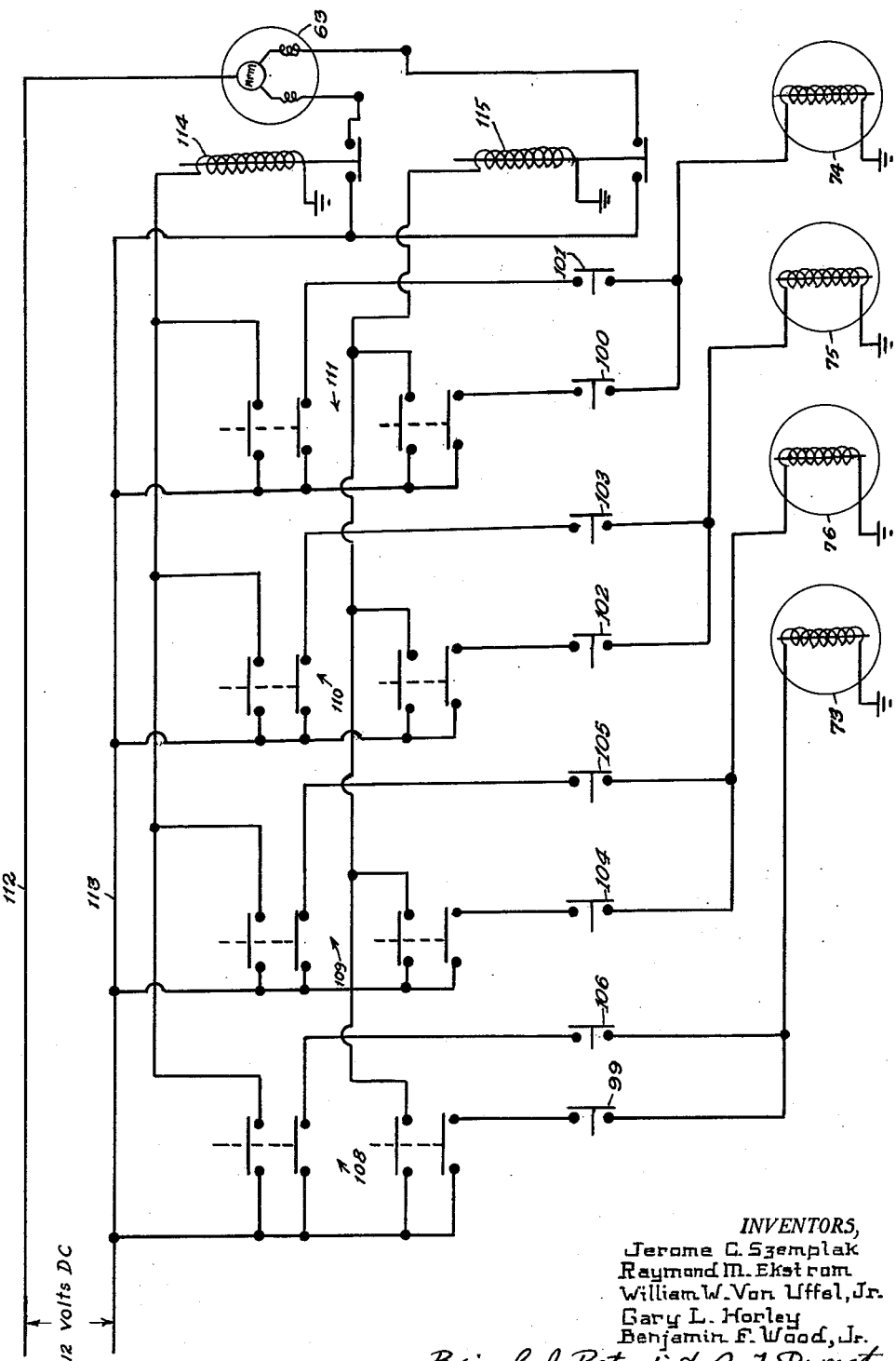

United States Patent Office 3,051,965
Patented Sept. 4, 1962

3,051,965
SUPINE BED
Jerome C. Szemplak, Cleveland, Ohio, Raymond M. Ekstrom, Shrewsbury, Mass., William W. von Uffel, Jr., Newtown Square, Pa., and Gary L. Horley, Aberdeen, and Benjamin F. Wood, Jr., Bel Air, Md., assignors to the United States of America as represented by the Secretary of the Army
Filed Feb. 27, 1961, Ser. No. 92,106
3 Claims. (Cl. 5—68)
(Granted under Title 35, U.S. Code (1952), sec. 266)

The invention described herein may be manufactured and used by or for the Government for governmental purposes without the payment to us of any royalty thereon.

This invention relates to a supine bed and more particularly to a bed, or chair, for supporting a human body when confined in cramped space such as a battle tank driver, gunner or the like, and is designed to adapt to all personnel and provide an infinite combination of body and leg positions to afford comfort over extended periods of time.

The bed of the present invention consists of adjustable panels for the lower and upper legs and the back. The entire bed is capable of longitudinal movement and is operated by a single motor driven threaded shaft.

It is a primary object of the invention to provide a fully powered adjustable bed, or chair, for use in a confined space.

It is another object to provide an adjustable bed, or chair, to fit personnel of varying statures.

A further object is to provide a bed, or chair, that gives quick automatic change of position of the angle of the back, angle of knees and the total position (forward and backward) of the operator's body.

A still further object of the invention is to provide an adjustable bed, or chair, having a single threaded drive shaft to operate any or all adjustable panels for changing the position of the legs and back or entire body of the operator.

A final object of the invention is to provide a motor driven, adjustable bed, or chair, operated by a plurality of electrical limit switches acting to start or stop an electric motor driving a common threaded drive shaft and engaging a series of electrical nuts which are adapted to engage the shaft to change the position of the bed at the will of the operator.

With these and other objects in view which will become apparent as the specification develops, reference is made to the drawings forming a part of the specification wherein:

FIG. 1 is a perspective view of the bed of the invention, the leg and back sections being in a raised position;

FIG. 2 is a side view of the bed shown in its most level position in full lines;

FIG. 3 is a sectional view taken along lines 3—3 of FIG. 2;

FIG. 4 is a cross section taken along line 4—4 of FIG. 1;

FIG. 5 is a cross section detail taken along line 5—5 of FIG. 3;

FIG. 6 is a cross section view taken along line 6—6 of FIG. 3;

FIG. 7 is a cross section view taken along line 7—7 of FIG. 3;

FIG. 9 is a cross section detail taken along line 9—9 of FIG. 7;

FIG. 14 is an enlarged top plan view of the head rest;

FIG. 15 is an enlarged side elevation of the head rest; and

FIG. 16 is a wiring diagram of the electrical system of the bed.

Figure 10:
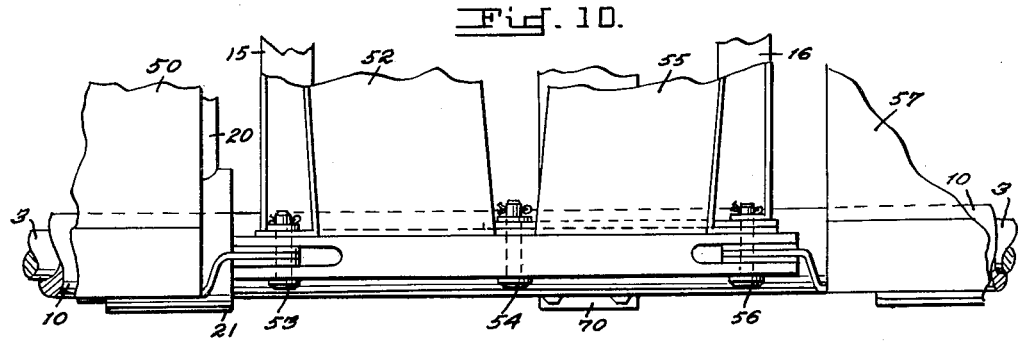
FIG. 10 is a fragmentary plan view of the bed seat and taken in a plane indicated by line 10—10 of FIG. 2 and looking in the direction of the arrows.
Figure 11:
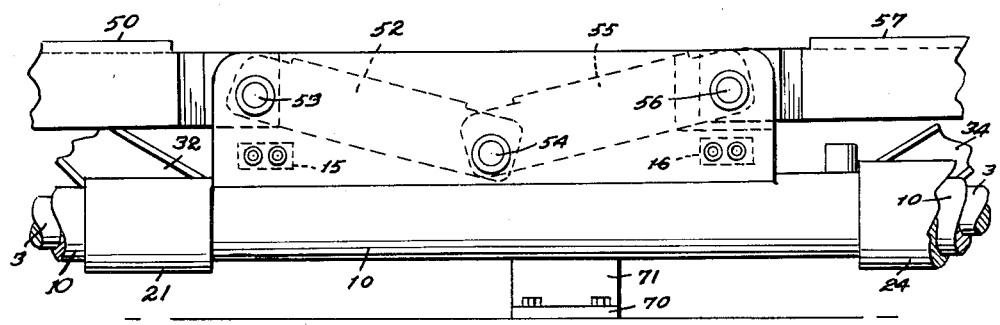
FIG. 11 is a side view of the bed seat of FIG. 10.
Figure 13:
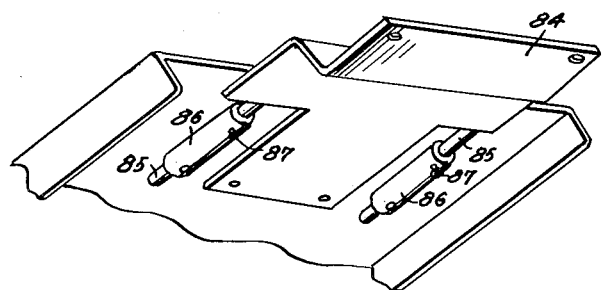
FIG. 13 is a fragmentary perspective view of the head rest plate and its position relative to the back rest panel.

Referring to the drawings, 1 designates the bed of the invention in toto. Bed 1 consists of a support frame indicated generally by 2. Frame 2 is comprised of a pair of spaced, parallel rails 3 and 4 which are supported at their ends by front rail supports 5 and 6 and rear rail supports 5a and 6a. Rail supports 5, 6, 5a, and 6a are connected by foot connecting plates 7 and 8 respectively which may be bolted to a stationary surface such as the floor of a tank, etc.

Reference character 9 denotes generally the undercarriage of the bed which is slidably mounted on rails 3 and 4.

Undercarriage 9 comprises a pair of parallel, axially spaced tubular members 10 and 11 and each member 10 and 11 receives a rail 3 and 4 respectively in slidable relation therein.

A seat frame indicated generally by 12 is mounted on the upper sides of tubular members 10 and 11 and consists of a pair of side panels 13 and 14 which are connected by a pair of main alignment bars 15 and 16.

Three cross bars are slidably mounted on the tubular members 10 and 11 and include a lower leg cross bar 17 integrally connected to a pair of opposed tubular sliders 18 and 19 which slide on members 10 and 11, an upper leg cross bar 20 integrally connected to tubular opposed slides 21 and 22 which slide on members 10 and 11 and a back cross bar 23 integrally connected to tubular opposed slides 24 and 25 which slide on members 10 and 11.

A pair of upstanding ears 26 are integrally secured to the slide 18 and another pair of similar ears 27 are attached to slide 19 and are for the purpose of pivotally mounting a pair of lower leg pivot arms 28 and 29 by pivot pins 30 and 31.

Figure 8:
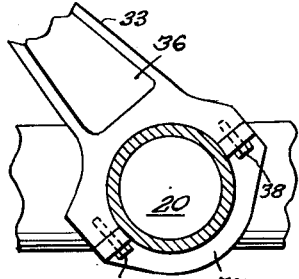
FIG. 8 is a cross sectional detail taken along line 8—8 of FIG. 3.

A pair of upper leg pivot arms 32 and 33 are rotatably mounted on the upper leg cross bar 20 and a third pair of pivot arms 34 and 35 are rotatably mounted on back cross bar 23. Pivot arms 32, 33, 34 and 35 (see FIG. 8) comprise an arm 36 and a collar 37 which are secured together by bolts 38 for rotation on cross bars 20 and 23.

A motor support plate, indicated generally by 39 is secured to the rearward end of tubular members 10 and 11 by collars 40 and 41 (see FIG. 7) and bolts 42 and 43. Plate 39 defines a bar portion 44 and an integral rearwardly extending portion 45 for a purpose which will be later apparent.

A main bed is indicated generally by 46 and comprises a lower leg section 47 to which pivot arms 28 and 29 are pivotally connected at their upper ends to the forward end thereof by pivot pins 48 and 49. An upper leg section 50 is pivotally mounted to the upper ends of upper pivot arms 32 and 33 and also the rearward end of lower leg section 47 by pins 51.

A main seat is provided and comprises a front fixed seat section 52 which is secured between panels 13 and 14 by pins 53 at its forward end and by pins 54 at its rearward end. A rear fixed seat section 55 is similarly mounted at its front end by pins 54 and at its rearward end by pins 56 between panels 13 and 14.

A lower back section 57 is pivoted at its front end to pins 56 between panels 13 and 14 and at its rearward end to the upper ends of arms 34 and 35 by pivot pins 58.

An upper back section 59 is connected to the lower back section 57 at its forward end by pivot pins 58 and is tilted to a desired angle for accommodating the back of the operator. To support this section 59 and prevent rotation, a bolt 60 locks this section to a pair of rearwardly extending extensions 61 on the lower back section 57.

All bed sections, 47, 50, 52, 57, and 59 are scooped as at 62 (see FIG. 4) to provide a comfortable contour to accommodate the operator.

Cushions, mattresses, etc. will be used (not shown) as needed and may be fastened to the bed sections by any suitable means (not shown).

The lower leg section 47, the upper leg section 50 and the entire back sections 57 and 59 are adjustable, only the seat sections 52 and 55 are fixed, being supported between panels 13 and 14 by pins 53, 54 and 56.

Means for adjusting the pivoted sections are provided and consist of a motor 63 which is connected to a gear housing 64, both being supported by motor support plate extension 45. The shaft 65 of motor 63 (see FIG. 9) extends into a gear housing 64 and is provided at this end with a worm screw 66 which meshes with a worm gear 67. Worm gear 67 is carried by the end of a threaded drive shaft 68. Shaft 68 extends forwardly and centrally between tubular members 10 and 11 to substantially the length of the bed.

Means are provided for moving the entire under carriage 9 both forward and backward and consist of a main alignment mount indicated generally by 69 (see FIG. 6). Mount 69 comprises a plate 70 which is secured to the floor of a tank or the like. Plate 70 defines an inverted U-shaped portion 71 which encompasses the threaded drive shaft 68 and a smaller inverted U-shaped strap 72 is secured within portion 71 which provides a space for an electric nut 73. (The bed is provided with four electric nuts in all.)

Electric nut 73 is a standard market item and consists of a female thread mounted in a fixed support (inverted U-shaped portions 71 and 72 in this instance) connected to the bed section. Attached to the mount is a stationary solenoid with a slidable armature therein having a pointed end. When the solenoid is energized the armature is forced into a slot in the periphery of the threaded female section locking in the shaft. When the solenoid is de-energized, the armature is withdrawn and the nut will float in place on the threaded shaft. (This construction is not shown, only the location of the electric nut being shown.)

Threaded shaft 68 also passes through lower leg cross bar 17, upper leg cross bar 20 and back cross bar 23 and through electric nuts 74, 75 and 76 housed, one each in a cross bar and encircling shaft 68. Each electric nut is housed in its respective cross bar as best viewed in FIG. 5. In this view, the nut 75 is trunnioned by bolts 77. (The manner in which the electric nuts operate will be explained later.)

A foot rest, indicated generally by 78, is provided and consists of a U-shaped bar 79 which is turned inwardly at its ends as at 80. These ends are slidably received in tubes 81 welded to the underside of lower leg section 47 and the foot rest is set in position by set screws 82.

A head rest is also provided for regulating the position of the head of the operator and is designated generally by 83. (See FIGS. 1, 13, 14 and 15.) The head rest 83 comprises a plate 84 having a pair of rods 85 welded to its front portion. These rods 85 are slidably received in a pair of tubes 86 welded to the under side of section 59. A set screw 87 is provided in each tube 86 to set the rods 85 at the desired adjustment therein.

A frame 88 for receiving a pillow is pivoted at its front end by pivot pins 89. A pair of slides 90 each having a slot 91 are provided for head adjustment and each slot is provided with notches 92. A roller 93 mounted on a pin 94 rides in each slot 91 and is connected to the underside of frame 88. A tension spring 95 is connected to a bar 96 which rigidly connects both slides 90 for a unitary movement.

A knob 97 is secured to frame 88 for adjusting the angle of head rest 83. Slides 90 are pivoted to the frame as at 98. By lifting the frame 88 by knob 97, head rest 83 will be raised and rollers 93 will enter the notches 92 and support the frame 88 in the desired position.

*The Electric System*

FIG. 16 is a wiring diagram of the electrical system of the bed.

Figure 12:
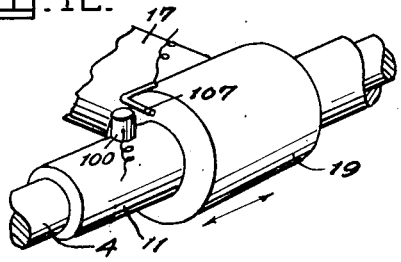
FIG. 12 is a detail perspective view showing one example of a limit switch for use with the bed.

Referring to FIG. 3, it will be observed that the location of electric micro limit switches are indicated as by 99, 100, 101, 102, 103, 104, 105 and 106. In this view the switches are not shown in detail, but rather only their location is indicated. For a more detailed view, a switch is shown in FIG. 12 that is illustrative of one manner of constructing the limit switch. A limit switch 100 is shown as one contact, and is mounted, at this location, on tubular member 11 while another contact 107 is provided on slide 19. Other types of switches may be used as desirable.

In the wiring diagram shown on FIG. 16, four switches are provided for activating the four electric nuts 73–76. These may be three-way toggle switches having positions of up, neutral or down. As shown in FIG. 16, switches 108, 109, 110 and 111 are shown as simple push pull switches for the sake of clarity. In one position, such as up, the motor 63 is activated in one direction, and in the down position of the switch, the motor 63 is reversed, thus giving a two directional rotation of shaft 68. As shown in FIG. 16, switch 108 is for moving nut 73, the main bed; switch 109, the back section; switch 110 the upper leg section and switch 111, the lower leg section. This arrangement is by way of example only as other arrangements may be used as is expedient for the operator's convenience.

Power source to motor 63 is supplied through leads 112 and 113. In circuit with the up position of switches 108–111 is a switching relay 114 while another switching relay 115 is in circuit with the down position of switches 108–111.

Switches 108–111 may be housed in a box or panel (not shown) to be placed at a convenient point for the operator's use, as for instance the side of the bed.

*Operation of the Bed*

As apparent, the entire bed and the slides carrying the undercarriage are movable backwards or forwards. When any one of the switches 108–111 is operated, either in up or down position, the corresponding switching relay 114, 115 will close the circuit to the electric motor 63 through leads 112 and 113 to cause threaded shaft 68 to rotate in the selected direction and the corresponding electric nut is activated to engage shaft 68 and act to move a cross bar or the entire bed until contact 107, on a slide (slide 19 being shown in FIG. 12 as an example), contacts a switch 99–106 (switch 100 being shown in FIG. 12 as an example) whereupon the corresponding electric nut is deactivated and the movement ceases.

As a more specific example of operation, the operator may desire to adjust the lower leg bed section 47. He moves switch 111 to the upper position thus energizing motor 63 to rotate threaded shaft 68 and at the same time causing electric nut 74 to engage threaded shaft 68. Cross bar 17 will be moved forward to move pivot arms 28, 29 to their upward position and raise lower leg bed section 47. As soon as slider 19 (see FIG. 12 for an example) with its contact 107 reaches the point where contact 107 touches switch 100, the circuit is broken and the nut 74 is deactivated and "floats" free. As long as the operator presses switch 111 in its upper position, the motor 63 will run. When he desires to lower the section 47, he flips switch 111 to its downward position and the cross bar 17 moves rearwardly until it makes contact with switch 101. The action is the same for operating all four of the electric nuts.

The nuts may be operated singly or as many together as are desired to adjust any or all bed sections since the micro switches do not interfere with the motor circuit. One section may be lowered and another raised at the same time.

The bed is highly versatile for various adjustments for personnel of varying sizes and into a wide selection of body positions.

Variations and modifications may be expected without departing from the scope of the novel concept of the present invention.

What is claimed is:

1. A supine bed comprising a stationary bed frame, an undercarriage slidably mounted on said bed frame, a seat frame carried by said bed frame, a series of cross members slidably mounted on said undercarriage, a pair of spaced, parallel arms pivoted at their lower ends to each said cross members, a main bed carried by the upper ends of said parallel arms and said seat frame, said main bed including a lower leg panel pivotally connected at its forward and rearward ends each to the upper ends of a pair of said parallel arms, an upper leg panel pivotally connected at its forward end to the rearward end of said lower leg section and at its rearward end to the forward end of said seat frame, main seat panels supported by said seat frame, a lower back panel pivotally connected at its forward end to the rearward end of said seat frame and at its rearward end to the upper ends to a pair of said parallel arms and an upper back panel rigidly fixed to the rearward end of said lower back panel, a drive member mounted on said bed frame and slidably received in said undercarriage and said cross bars and electrical means for adjusting said bed comprising, an electrically operated engaging member carried by said undercarriage and each of said cross members, each engaging member adapted to engage said drive member when selectively energized to move said undercarriage and said cross bars along said drive member.

2. A supine bed as claimed in claim 1, wherein said bed frame comprises a pair of parallel rails and a rail support fixed to said rails at the ends thereof.

3. A supine bed comprising a stationary bed frame; an undercarriage slidably mounted on said bed frame; a seat frame carried by said undercarriage; a first cross member slidable on said undercarriage; a second cross member slidable on said undercarriage; a third cross member slidable on said undercarriage; a pair of parallel arms pivotally mounted at their lower ends to each said cross member; a main bed carried by the upper ends of said parallel arms and said seat frame, said main bed including a lower leg panel pivotally connected at its forward and rearward ends each to the upper ends of a pair of said parallel arms, an upper leg panel pivotally connected at its forward end to the rearward end of said lower leg section and at its rearward end to the forward end of said seat frame, main seat panels supported by said undercarriage, a lower back panel pivotally connected at its forward end to the rearward end of said seat frame and at its rearward end to the upper ends to a pair of said parallel arms and an upper back panel rigidly fixed to the rearward end of said lower back panel; a stationary member mounted independently of said bed frame; and means for adjusting said bed comprising, a reversible motor mounted on said bed frame, a threaded drive shaft disposed centrally of said bed frame, said shaft being driven by said motor and being slidably received in said first, second and third cross bars and said stationary member, an electrical nut carried by each said cross bar and said stationary member, each said nut adapted to grip said shaft when electrically energized to selectively slide a cross bar and said undercarriage, backward and forward along said bed frame to rotate said pivot arms to adjust said bed panels; and means limiting the movement of each said cross bar and said undercarriage in either direction, said means comprising, a series of micro switches disposed on said stationary bed frame and located, one each, on one end of said bed frame, one each on each side of said first, second, and third cross bars, whereby when the undercarriage, first, second, and third cross bars contact a respective micro switch, said electric nut in said stationary member, said first, second and third cross bars will become de-energized and stop movement of the respective undercarriage or cross bar.

References Cited in the file of this patent

UNITED STATES PATENTS

| | | |
|---|---|---|
| 347,024 | Bonnefoy | Aug. 10, 1886 |
| 1,658,736 | Ortimeier | Feb. 7, 1928 |
| 1,693,427 | Anderson | Nov. 27, 1928 |
| 2,322,512 | Fox et al. | June 22, 1943 |
| 2,617,117 | Putterbaugh | Nov. 11, 1952 |
| 2,924,265 | Himka | Feb. 9, 1960 |